United States Patent
Vizi et al.

(10) Patent No.: US 9,081,173 B2
(45) Date of Patent: Jul. 14, 2015

(54) LASER SCANNING MICROSCOPE FOR SCANNING ALONG A 3D TRAJECTORY

(75) Inventors: E. Szilveszter Vizi, Budapest (HU); Gergely Katona, Budapest (HU); J. Balazs Rozsa, Budapest (HU)

(73) Assignee: Femtonics Kft., Budapest (HU)

( * ) Notice: Subject to any disclaimer, the term of this patent is extended or adjusted under 35 U.S.C. 154(b) by 850 days.

(21) Appl. No.: 12/737,426

(22) PCT Filed: Jul. 14, 2009

(86) PCT No.: PCT/HU2009/000057
§ 371 (c)(1),
(2), (4) Date: May 4, 2011

(87) PCT Pub. No.: WO2010/007452
PCT Pub. Date: Jan. 21, 2010

(65) Prior Publication Data
US 2011/0211254 A1     Sep. 1, 2011

(30) Foreign Application Priority Data
Jul. 15, 2008   (HU) ..................... 0800433

(51) Int. Cl.
   *G02B 21/00*    (2006.01)
(52) U.S. Cl.
   CPC .......... *G02B 21/0048* (2013.01); *G02B 21/006* (2013.01); *G02B 21/0084* (2013.01)
(58) Field of Classification Search
   CPC .. G02B 21/00; G02B 21/0004; G02B 21/002; G02B 21/0024; G02B 21/0036; G02B 21/0048; G02B 21/006; G02B 21/008
   USPC ......................... 359/368, 383, 385, 391–393, 359/196.1–199.1
   See application file for complete search history.

(56) References Cited

U.S. PATENT DOCUMENTS

| | | | | |
|---|---|---|---|---|
| 5,081,349 | A * | 1/1992 | Iwasaki | 250/234 |
| 5,132,526 | A * | 7/1992 | Iwasaki | 250/201.3 |
| 5,532,874 | A * | 7/1996 | Stein | 359/394 |
| 5,880,465 | A * | 3/1999 | Boettner et al. | 250/234 |
| 7,232,980 | B2 * | 6/2007 | Oshiro et al. | 250/201.3 |
| 7,242,485 | B2 * | 7/2007 | Akishiba | 356/614 |
| 7,253,946 | B2 * | 8/2007 | Bellouard et al. | 359/368 |
| 7,312,919 | B2 * | 12/2007 | Overbeck | 359/368 |
| 7,324,425 | B2 * | 1/2008 | Matsui | 369/112.29 |
| 7,486,329 | B2 * | 2/2009 | Endo | 348/345 |
| 2005/0122577 | A1 * | 6/2005 | Fujimoto et al. | 359/383 |
| 2005/0122579 | A1 * | 6/2005 | Sasaki | 359/385 |
| 2007/0291280 | A1 * | 12/2007 | Rembe et al. | 356/516 |
| 2008/0151366 | A1 * | 6/2008 | Araya et al. | 359/385 |

OTHER PUBLICATIONS

Gobel, W. et al., Imaging cellular network dynamics in three dimensions using fast 3D laser scanning, Nature Methods, Jan. 2007, pp. 73-79, vol. 4, No. 1.

* cited by examiner

*Primary Examiner* — Thong Nguyen
(74) *Attorney, Agent, or Firm* — Olson & Cepuritis, Ltd.

(57) ABSTRACT

A laser scanning microscope is provided with a laser beam focusing device, a drive for the focusing device, a laser beam deflector, and a control system that coordinates movement of the focusing device with that of the laser beam deflector.

16 Claims, 4 Drawing Sheets

LASER SCANNING MICROSCOPE FOR SCANNING ALONG A 3D TRAJECTORY

CROSS-REFERENCE TO RELATED APPLICATIONS

This application is a U.S. National Phase entry of PCT/HU2009/000057 filed on 14 Jul. 2009 which, in turn, claims priority of Hungarian Patent Application No. P0800433 filed on 15 Jul. 2008, each of which is incorporated herein by reference.

BACKGROUND OF THE INVENTION

The present invention relates to a laser scanning microscope having
  focusing means having a focal plane and comprising at least one optical element for focusing a laser beam,
  drive means for displacing the at least one optical element of the focusing means for changing the position of the focal plane, and
  deflecting means for deflecting the laser beam.
The invention further relates to a method for scanning a sample along a 3D trajectory using such laser scanning microscope Three-dimensional (3D) laser scanning technologies have great importance in analysing biological specimens e.g. imaging 3D biological structures or mapping fluorescent markers of cell surface receptors on non-planar surfaces.

Commonly used 3D laser scanning microscopes are either confocal microscopes or two-photon microscopes. In the confocal microscope technology a pinhole is arranged before the detector to filter out light reflected from any other plane than the focus plane of the microscope objective. Thereby it is possible to image planes lying in different depths within a sample (e.g. a biological specimen).

Two-photon laser scanning microscopes use a laser light of lower energy of which two photons are needed to excite a flourophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, i.e. a small ellipsoidal volume having typically a size of approximately 300 nm×300 nm×1000 nm. Generally a femtosecond pulsed laser is used to provide the required photon flux for the two-photon excitation, while keeping the average laser beam intensity sufficiently law.

When applying either of the above-mentioned technologies the 3D scanning can be carried out by moving the sample stage e.g. via stepping motors, however this is complicated to implement when using submerge specimen chambers or when electrical recording is performed on the biological specimen with microelectrodes. Accordingly, in the case of analysing biological specimens it is often preferred to move the focus spot of the laser beam instead of moving the specimen. This can be achieved by deflecting the laser beam to scan different points of a focal plane (XY plane) and by displacing the objective along its optical axis (Z axis) e.g. via a piezo-electric device to change the depth of the focal plane. Several known technologies exist for deflecting the laser beam prior to it entering the objective, e.g. via deflecting mirrors mounted on galvanometric scanners, or via accousto-optical deflectors.

The galvanometric scanners and the accousto-optical deflectors are very fast devices, hence moving the focus spot to a desired XY plane position and obtaining measurement data via the detector in that position can be carried out in less than 1 ms. However, due to the inertia of the microscope objective the Z positioning takes substantially more time, rendering the 3D scanning a lengthy operation.

In "Imaging cellular network dynamics in three dimensions using fast 3D laser scanning" (Nature Methods, Vol. 4 No. 1, January 2007) Gobel et al. propose to drive a piezo-electric device of a laser scanning microscope objective with a sinusoidal signal and calculate an appropriate drive signal for the X-Y scanners (galvanometric scan mirrors) to obtain a desired 3D trajectory. The article discusses measurements made at a sinusoidal drive signal of 10 Hz and suggests adjustment of the drive signal to compensate for amplitude reduction and phase shift of the actual objective position with respect to the drive signal of the piezo-electric device.

One of the problems associated with the above method is a deviation from the desired scan trajectory because the movement of the objective deviates from sinusoidal owing to the properties of the piezo-electric device and other mechanical components. This problem is not crucial at low frequencies of the sinusoidal drive signal, such as the 10 Hz frequency used by Göbel et al. However, the deviation becomes more and more important as the frequency is increased.

Being constrained to use low frequencies is less disturbing when scanning a large number of X-Y positions in each scanning plane (i.e. planes lying at different Z depths within the specimen) as the fast XY positioning allows for obtaining a plurality of scans while the focus plane remains substantially in the same Z plane. Thus, effectively, the relatively long time spent in each scanning plane is not wasted as a plurality of measurements can be carried out. On the other hand, when scanning specimens having only a few points of interest in each Z plane, e.g. a nerve cell dendrite crossing such planes, the aim is to spend as little time in each Z plane as possible in order to decrease the overall scan time. Therefore it would be desirable to increase the frequency of the sinusoidal drive signal but as indicated by Göbel et al., such an increase in the frequency would result in a higher deviation between the displacement of the objective and a theoretical sinusoidal displacement corresponding to the sinusoidal drive signal, which could lead to an intolerable deviation from the desired 3D scanning trajectory, effectively the positions of interest within the specimen could be out of focus or could be missed entirely.

It is an object of the present invention to overcome the above problem and provide a method and device capable of compensating for a deviation between the motion of an objective connected to a drive means and the drive signal of the drive means.

BRIEF SUMMARY OF THE INVENTION

In a first aspect the invention provides a laser scanning microscope having
  focusing means having a focal plane and comprising at least one optical element for focusing a laser beam,
  drive means for displacing the at least one optical element of the focusing means for changing the position of the focal plane, and
  deflecting means for deflecting the laser beam.
The microscope comprises a control system configured to carry out the steps of
  providing a periodical drive signal for the drive means,
  obtaining time dependant displacement data of the at least one optical element of the focusing means in response to the periodical drive signal of the drive means, providing a response function using the time dependant displacement data, calculating a drive signal for the deflecting means using the response function to move the focal volume of the laser beam along a given 3D trajectory within a sample to be examined.

In a second aspect the invention provides a method for scanning a sample along a 3D trajectory using a laser scanning microscope having focusing means having a focal plane and comprising at least one optical element for focusing a laser beam, drive means for displacing the at least one optical element of the focusing means for changing the position of the focal plane, and deflecting means for deflecting the laser beam.

The method comprises the following steps:

providing a periodical drive signal for the drive means, obtaining time dependant displacement data of the at least one optical element of the focusing means in response to the periodical drive signal of the drive means, providing a response function using the time dependant displacement data, calculating a drive signal for the deflecting means using the response function to move the focal volume of the laser beam along the 3D trajectory within the sample.

Further advantageous embodiments of the invention are defined in the attached dependent claims.

Further details of the invention will be apparent from the accompanying figures and exemplary embodiments.

DETAILED DESCRIPTION OF THE INVENTION

Figure 1:
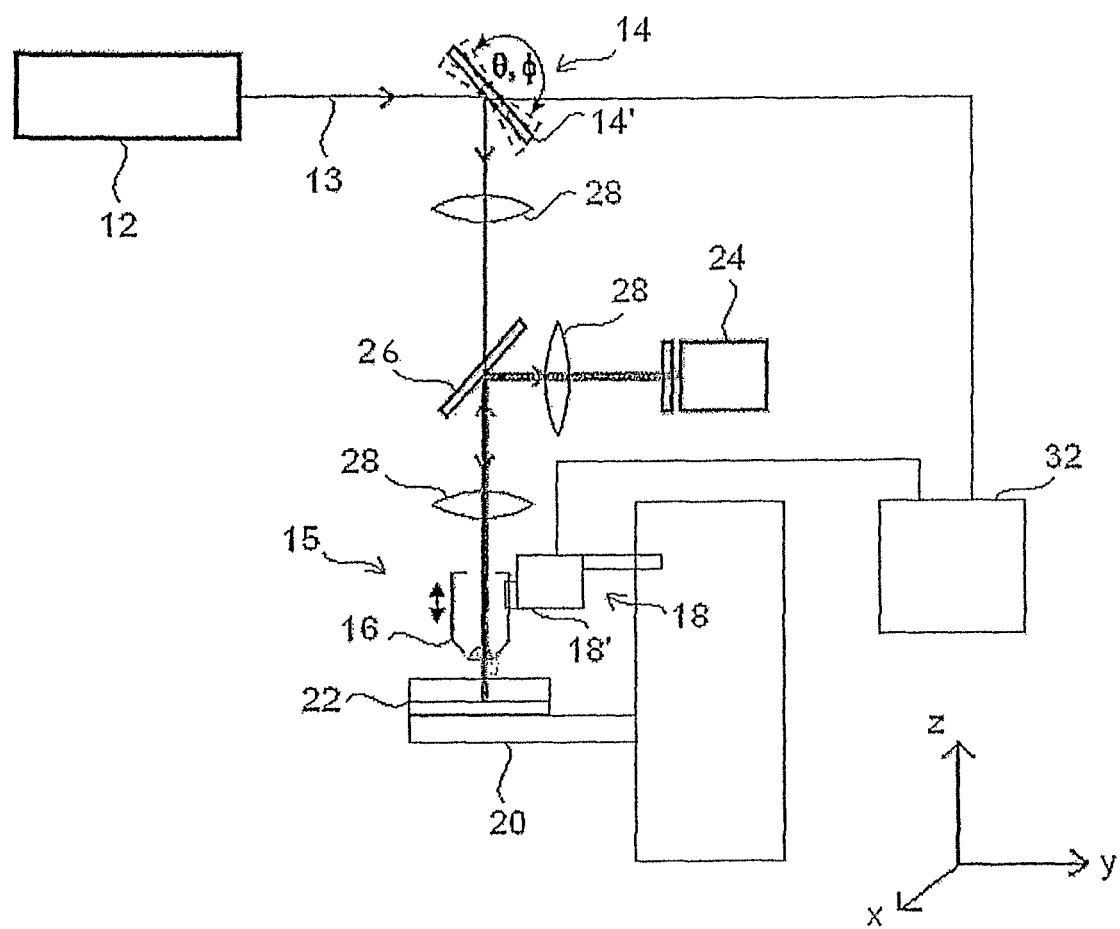
FIG. 1 is a schematic diagram of a laser scanning microscope according to the invention.

FIG. 1 is a schematic diagram illustrating an embodiment of a laser scanning microscope 10 according to the invention. The microscope 10 comprises a laser source 12 providing a laser beam 13; beam deflecting means 14 for deflecting the laser beam 13 in X and Y directions; focusing means 15, in this case a microscope objective 16; drive means 18 for displacing the objective 16 along the optical axis of the objective 16; a sample stage 20 for holding or supporting a sample 22 (e.g. a biological specimen 22') under the objective 16; and a detector 24.

In the embodiment illustrated in FIG. 1 depth scanning is achieved using the known two-photon laser excitation technology. It is to be noted however, that any other technology allowing for scanning at various focal depths, e.g. confocal microscope technology, could be applied in connection with the present invention.

For the purpose of two-photon laser excitation the laser source 12 can be a femtosecond impulse laser, e.g. a Mode-locked Ti-sapphire laser providing the laser beam 13. In such case the laser beam 13 is made up of discrete laser impulses of MHz repetition rate and femtosecond impulse width.

A dichroic mirror 26 is arranged along the optical path of the laser beam 13 to separate the laser beam 13 provided by the laser source 12 from the fluoroscence photons emitted by the excited fluorophores of the sample 22 under examination. Any suitable detector 24 can be used, e.g. a photo multiplier, to detect the emitted photons. Also, more than one detectors 24 provided with appropriate wavelength filters can be arranged in a known way if emitted photons of different wavelengths are to be detected separately.

The deflecting means 14 can be any suitable beam deflecting devices, such as accousto-optical or electro-optical deflectors, galvanometric scanning mirrors 14' (mirrors mounted on galvanometric scanners configured to deflect the laser beam 13 in X and Y directions for scanning within a given focal plane), etc.

Additional optical guide means such as lenses 28 or mirrors (e.g. spherical mirrors guiding the laser beam 13 onto and between the scanning mirrors 14') can be provided to create a desired optical path and to hinder divergence of the laser beam 13.

Figure 1A:
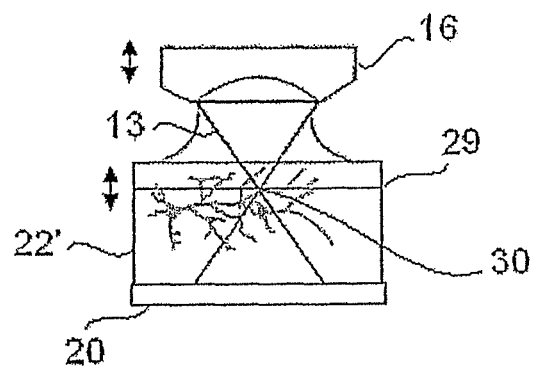
FIG. 1a is an enlarged view of a sample under the objective of the microscope of FIG. 1.

The microscope objective 16 is mounted on the objective drive means 18, which is preferably a piezo-electric device 18' capable of providing very fast micro- and even nano-scale displacements, but optionally other types of suitable devices and optomechanical solution can be used as well to modify the position of the focal plane within the sample, e.g. electromagnetic positioning of the optical parts, mechanical step motor drives, resonant driving of optical elements mounted on springs, or a modified imaging system objective can be used, wherein only one small lens is moved within the objective, whereby the working distance of the objective (i.e. the position of the focal plane) can be changed without having to move the whole mass of the objective. As illustrated in FIG. 1a when the objective 16 is displaced along its optical axis (i.e. in the Z direction) the focal plane 29 of the objective 16 is shifted relative to the sample 22 (depicted as a biological specimen 22'), thus the focus spot 30 (i.e. the focal volume of the laser beam 13) can be moved in the Z direction.

A control system 32 is provided for controlling the beam deflecting means 14 and the drive means 18 of the objective 16. The control system 32 can be a single unit, e.g. a computer or a microcontroller, or it can comprise a plurality of interrelated control units separately controlling components of the microscope 10, such as the objective drive means 18 and the deflecting means 14. In the latter case a main control unit can be provided for obtaining data (such as position feedback information) from the other control units, for analysing such data and for sending back appropriate control signals to the control units. The control system 32 can be a built-in unit of the microscope 10 or it can be a separate device or a control software running on a separate device such as a computer program running on a separate computer.

Scanning the sample along a 3D trajectory is carried out in the following way.

Figure 2:
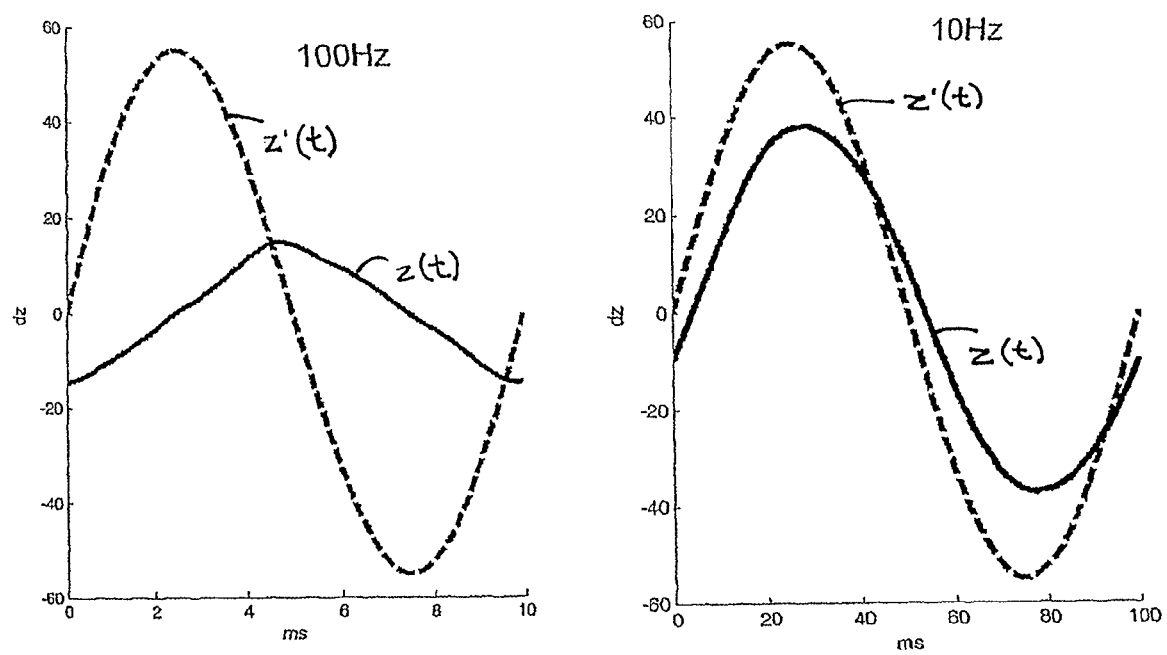
FIG. 2 illustrates a theoretical response function of a drive means carrying the microscope objective and the real response function of the drive means to a sinusoidal drive signal at two different frequencies.

First, the microscope 10 is calibrated for a desired Z-frequency (i.e. the scanning frequency in the Z direction). For example a sinusoidal voltage signal (or any other periodical signal) of the desired Z-frequency and amplitude is provided by the control system 32 as drive signal for the piezo-electric device 18', which induces mechanical oscillation of the microscope objective 16 along the optical axis (in the Z direction). The displacement of the objective 16 in response to the sinusoidal drive signal can be obtained in any conventional manner, e.g. by an external measuring device or e.g. using the position feedback signal of the piezo-electric device 18'. A response function $z(t)$ is calculated from the time dependant displacement by the control system 32. FIG. 2 illustrates the obtained response function $z(t)$ and a theoretical response function $z'(t)$ corresponding to the displacement of an ideal piezo-electric device (zero mass, instantaneous response to a voltage change, etc.) at two different drive signal frequencies: a 10 Hz and 100 Hz. As can be seen the amplitude of the real response function $z(t)$ is reduced and its phase is shifted. The amplitude reduction can be compensated for by increasing the amplitude of the drive signal (the voltage signal) and the phase shift can be taken into account without difficulty. However, as the applied Z-frequency is increased (see the diagram showing the 100 Hz drive signal frequency) the shape of the resulting response function $z(t)$ starts to deviate from the shape of the drive signal (and the theoretical response function $z(t)$). In case of a sinusoidal drive signal the increase in the Z-frequency results in a less and less sinusoidal response function $z(t)$, which cannot be compensated for at the level of the drive signal.

The focal plane 29 of the objective 16 is at a given distance relative to the objective 16, thus it moves together with the objective 16 and the piezo-electric device 18'. Hence, the response function $z(t)$ is suitable for describing the position of the focal plane 29 since a simple linear relationship can be established between the two. For the sake of simplicity hereinafter the response function $z(t)$ is considered to correspond to the time dependant position of the focal plane 29 of the objective 16.

It was found that the response function $z(t)$ to a periodical signal (e.g. the above discussed sinusoidal signal) becomes stable after sufficient periods of the drive signal rendering the response function $z(t)$ suitable for calibrating the microscope 10. For example in the case of a sinusoidal drive signal 50-100 periods were found to be sufficient to obtain a reliable $z(t)$ function for calibration purposes.

The method according to the invention is based on the idea of generating a corresponding drive signal for the deflecting means 14, which takes the shape distortion of the stable response function $z(t)$ of the objective drive means 18 (e.g. the piezo-electric device 18') into account.

Figure 3A:
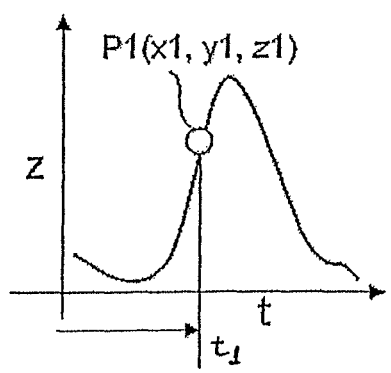
FIG. 3a is a diagram of the response function of the objective drive means.
Figure 3B:
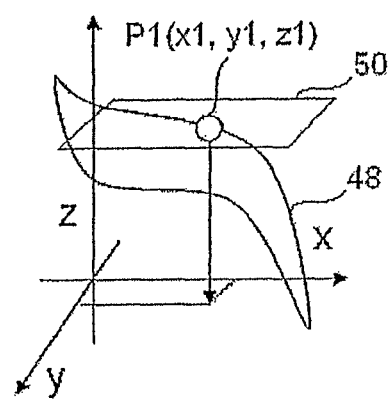
FIG. 3b is a diagram illustrating a 3D scanning trajectory.
Figure 3C:
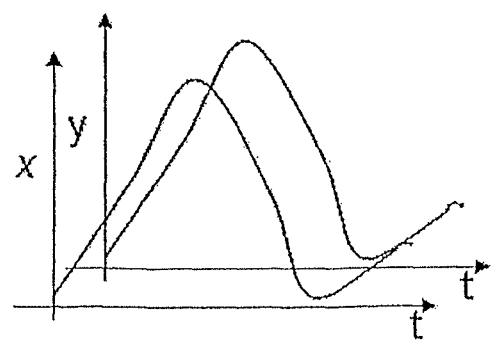
FIG. 3c is a diagram illustrating the calculated X-Y trajectory as a function of time.

FIGS. 3a-3c illustrates how such XY drive signal can be generated by the control system 32. FIG. 3a is a diagram showing the Z position of the objective 16 as a function of time within a single oscillation period after the oscillation has become stable. FIG. 3b is a diagram illustrating a 3D scanning trajectory 48 passing through a plurality of scanning planes 50, i.e. the planes at different Z depths within the sample 22 where scanning is to be performed. The trajectory 48 is made up of scanning positions P (practically micro-volumes), which can be described by (x, y, z) coordinates. When wishing to scan a P1(x1, y1, z1) position lying in a given scanning plane 50 the following steps are performed by the control system 32. First, using the $z(t)$ response function (which is understood to correspond to the time dependant position of the focal plane 29 of the objective 16), a t1 time (instant) is determined when the focal plane 29 of the objective 16 will be at $z(t1)=z1$ height (i.e. the height where the focal plane 29 will coincide with the desired scanning plane 50), then an XY drive signal is generated for the deflecting means 14 to direct the focus spot 30 of the beam 13 to (x1, y1) position at the determined t1 time. The same calculation can be carried out for the whole of the 3D trajectory and the XY drive signal illustrated in FIG. 3c is generated. It should be noted that there can be an infinite number of t1 instances when the objective 16 is at z1 height since the drive signal of the piezo-electric device 18 is a periodical function. If the scanning Z-frequency is high and there are too many scanning positions in some scanning planes 50 to be scanned within one oscillation period, then each such position may be scanned in a separate oscillation period.

The above described method allows for the use of high Z-frequencies, e.g. in the range of 50-200 Hz permitting very fast 3D scanning of samples 22 in which only a fraction of the whole area of the scanning planes 50 is of interest. This is particularly useful where a large number of measurements need to be carried out on such a sample 22 under different environmental conditions, e.g. on a biological specimen 22 under different types of stimulations.

A further advantage of the present invention is that the above described method does not compromise the XY resolution.

Figure 4A:
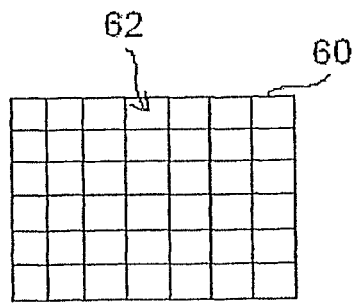
FIG. 4a is a top view of a stage comprising a grid.
Figure 4B:
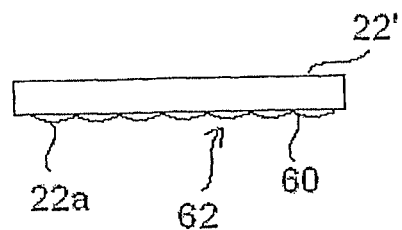
FIG. 4b is a side view of the grid of FIG. 4a with a sample supported thereupon.

Prior art laser scanning microscopes generally comprise a glass stage or other smooth-surfaced stages. However, with the use of high Z-frequencies a new problem arises: the vibrations of the oscillating objective 16 can be transmitted to the stage 20 via the mechanical connections of the microscope 10 or the medium (gas or liquid) between the objective 16 and the sample 22. Thus simply placing the sample 22 on a prior art glass stage might not be sufficient to keep the sample 22 in position as the vibration of the stage 20 can cause slight displacement of the sample 22 during the measurement. Such displacements could render the measurement useless as the volumes of interest of the sample 22 could leave the pre-calculated scanning trajectories 48. It is therefore suggested to provide the inventive scanning microscope 10 with securing means for fixing the position of the sample 22 during the measurement. Such securing means can be a stage 20 having a rough surface, preferably a surface with gratings, thereby the sample 22—in particular a soft biological specimen 22'—can sink into the surface with the gratings pressing into the bottom of the specimen 22'. For example the stage 20 can be formed as a grid 60 (FIG. 4a), e.g. a metal grid or a grid of a suitable hard polymeric material. As illustrated in FIG. 4b the biological specimen 22' sits firmly on the grid 60 as parts of its bottom surface 22a sink into the mesh spaces 62, while the grid 60 itself presses into the bottom surface 22a of the specimen 22' thereby securing the specimen 22' in its position.

Apart from the better sample-retaining properties of the grid 60 as compared to the prior art smooth-surfaced stages, the grid 60 has a further advantage when imaging living biological specimens 22', which need to be kept in a special physiological solution. The objective 16 is preferably a water immersion objective (as illustrated in FIG. 1a) and the living specimen 22' is immersed in the physiological solution, preferably circulated around the specimen 22'. The use of a grid 60 as the stage 20 provides the extra advantage of allowing the living specimen 22' to be in contact with the physiological solution at its bottom surface 22a as well through the mesh spaces 62 of the grid 60.

Figure 5:
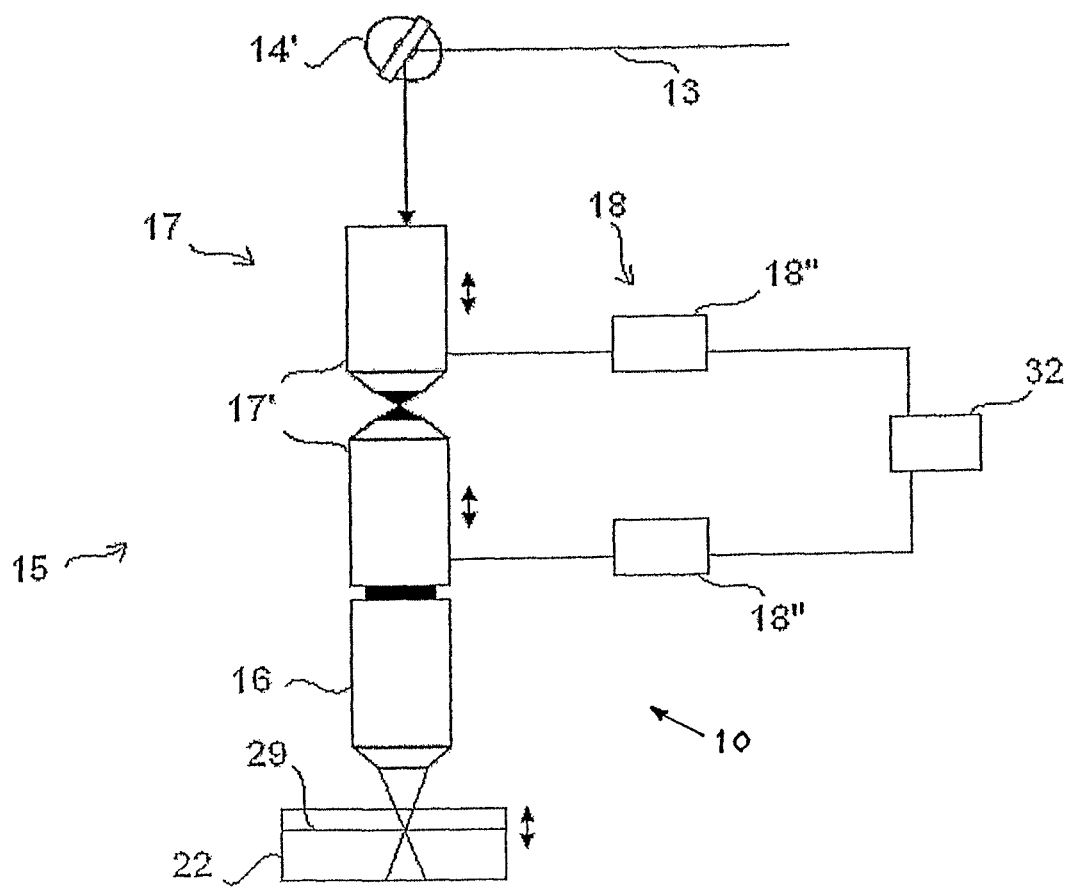
FIG. 5 is a schematic diagram of an alternative embodiment of a focusing means in a laser scanning microscope according to the invention.

FIG. 5 illustrates a further embodiment of a scanning microscope 10 according to the invention. In this embodiment the focusing means 15 comprises more than one optical elements: an objective 16 and a number of lenses 17' making up a lens system 17. Instead of or in addition to displacing the objective 16 via the drive means 18 it is also possible to change the position of the focal plane 29 within the sample 22 by displacing one or more other optical elements, via one or more other drive means 18. For example one or both lenses 17' of the depicted lens system 17 may be provided with electromagnetic positioners 18" as drive means 18, which may be controlled by the control system 32 of the scanning microscope 10. The electromagnetic positioners 18" can be any conventionally used electromagnetic linear drive mechanism. Furthermore, any other suitable drive means 18 can be used as well, e.g. piezo positioners, step motor drives.

It is also possible to provide phase shifted drive signals for the drive means 18 of the different optical elements, which are to be oscillated for the purpose of changing the position of the focal plane 29 of the focusing means 15. This allows for additional ways of compensating for deviation of the shape of the response functions z(t) from the drive signals. For example the drive signals of two optical elements—such as the two lenses 17'—may be in opposite phase to each other.

The above-described embodiments are intended only as illustrating examples and are not to be considered as limiting the invention. Various modifications will be apparent to a person skilled in the art without departing from the scope of protection determined by the attached claims.

The invention claimed is:

1. Laser scanning microscope (10) comprising
    focusing means (15) having a focal plane (29) and an optical axis and comprising at least one optical element for focusing a laser beam (13),
    drive means (18) for displacing the at least one optical element of the focusing means (15) for changing a position of the focal plane (29), and
    deflecting means (14) for deflecting the laser beam (13), and
    a control system (32) configured to carry out the steps of:
        providing a periodical drive signal having a frequency between 50 and 200 Hz for the drive means (18),
        displacing the at least one optical element of the focusing means (15) along its optical axis with the drive means (18) in response to the periodical drive signal,
        obtaining time dependant displacement data of the at least one optical element of the focusing means (15) in response to the periodical drive signal of the drive means (18),
        providing a response function (z(t)) using the time dependant displacement data, and
        calculating an XY drive signal for the deflecting means (14) using the response function (z(t)) which takes into account a shape distortion of the response function (z(t)) with respect to the periodical drive signal,
        generating the XY drive signal for the deflecting means (14) in order to move a focal volume (30) of the laser beam (13) along a given 3D trajectory (48) within a sample to be examined.

2. The laser scanning microscope according to claim 1, wherein the microscope (10) is a two-photon laser scanning microscope.

3. The laser scanning microscope according to claim 1, wherein the microscope (10) is a confocal laser scanning microscope.

4. The laser scanning microscope according to claim 1, wherein the focusing means (15) comprises an objective (16) as optical element and the drive means (18) comprises a piezo-electric device (18') configured to displace the objective (16).

5. The laser scanning microscope according to claim 1, wherein the focusing means (16) comprises a plurality of optical elements of which at least two is provided with drive means (18), the control system (32) providing periodical drive signals to each such drive means (18).

6. The laser scanning microscope according to claim 5, wherein the drive signals of the at least two optical elements are phase shifted relative to each other.

7. The laser scanning microscope according to claim 1, wherein the control system is configure to provide a sinusoidal voltage signal for the drive means (18).

8. The laser scanning microscope according to claim 1, wherein the deflecting means (14) comprises galvanometric scanning mirrors (14') or accousto-optical deflectors.

9. Method for scanning a sample (22) along a 3D trajectory (48) at a frequency between 50 to 200 Hz using a laser scanning microscope (10) having
    focusing means (15) having a focal plane (29) and an optical axis and comprising at least one optical element for focusing a laser beam (13),
    drive means (18) for displacing the at least one optical element of the focusing means (15) for changing a position of the focal plane (29), and
    deflecting means (14) for deflecting the laser beam (13), which comprises the steps of:
        providing a periodical drive signal having a frequency between 50 and 200 Hz for the drive means (18),
        displacing the at least one optical element of the focusing means (15) along its optical axis with the drive means (18) in response to the periodical drive signal,
        obtaining time dependant displacement data of the at least one optical element of the focusing means (15) in response to the periodical drive signal of the drive means (18),
        providing a response function (z(t)) using the time dependant displacement data, and
        calculating an XY drive signal for the deflecting means (14) using the response function (z(t)) which takes into account a shape distortion of the response function (z(t)) with respect to the periodical drive signal,
        generating the XY drive signal for the deflecting means (14) in order to move a focal volume (30) of the laser beam (13) along the 3D trajectory (48) within the sample (22).

10. The method according to claim 9, wherein a confocal laser scanning microscope (10) or a two-photon laser scanning microscope (10) is used.

11. The method according to claim 9, wherein the focusing means (15) comprises an objective (16) as optical element and the drive means (18) comprises a piezo-electric device (18') for displacing the objective (16).

12. The method according to claim 9, wherein the drive signal provided for the drive means (18) is a sinusoidal voltage signal.

13. The laser scanning microscope according to claim 9 further comprising securing means for fixing a position of the sample (22) to be examined.

14. The laser scanning microscope according to claim 13, wherein the sample (22) is a biological specimen (22') and the securing means is a support grid (60) having mesh spaces (62) through which the biological specimen (22') can be nourished with a physiological solution.

15. The method according to claim 9, wherein the deflecting means (14) comprises galvanometric scanning mirrors (14') or accousto-optical deflectors.

16. The method according to claim 9, further comprising the step of placing a living biological specimen as sample (22) on a microscope stage (20) comprising a support grid (60) having mesh spaces (62) and nourishing the specimen (22) with a physiological solution through the mesh spaces (62).

* * * * *